April 16, 1968     O. FUNICIELLO     3,378,122
SYNCHROMESH GEARS

Filed Oct. 23, 1965     3 Sheets-Sheet 1

INVENTOR
ORAZIO FUNICIELLO
BY *Steinberg + Blake*
ATTORNEYS

April 16, 1968   O. FUNICIELLO   3,378,122
SYNCHROMESH GEARS

Filed Oct. 23, 1965   3 Sheets-Sheet 2

INVENTOR
ORAZIO FUNICIELLO
BY Steinberg + Blake
ATTORNEYS

April 16, 1968  O. FUNICIELLO  3,378,122
SYNCHROMESH GEARS

Filed Oct. 23, 1965  3 Sheets-Sheet 3

INVENTOR
ORAZIO FUNICIELLO
BY *Steinberg & Blake*
ATTORNEYS

United States Patent Office 3,378,122
Patented Apr. 16, 1968

3,378,122
SYNCHROMESH GEARS
Orazio Funiciello, Via Rosmini 9, Bergamo, Italy
Filed Oct. 23, 1965, Ser. No. 503,321
17 Claims. (Cl. 192—53)

ABSTRACT OF THE DISCLOSURE

A synchromesh gearing for gear transmissions of motor cars and the like. The synchromesh gearing includes coaxial rotary driving and driven gears. The driving gear is supported for axial displacement with respect to the driven gear between a disengaged position where the driving gear is axially displaced from and out of engagement with the driven gear and a meshing position where the driving gear meshes with the driven gear. A synchronizing means is operatively connected to the driven gear for driving the latter at the speed of rotation of the driving gear as the latter is displaced from its disengaged position to its meshing position, so that during meshing of the gears they will rotate at the same speed. A transmission means is operatively connected with the driving gear and with the synchronizing means for transmitting a drive from the driving gear to the synchronizing means to drive the latter at the speed of the driving gear so that the synchronizing means will drive the driven gear at the latter speed as the driving gear approaches its position meshing with the driven gear. A disconecting means coacts with this latter transmission means and responds automatically to movement of the driving gear from its disengaged to its meshing position for at least momentary disconnecting the drive provided by the latter transmission means just prior to meshing of the gears so as to provide substantially free rotary movement for the driven gear with respect to the driving gear, thus facilitating movement of the driving gear into meshing engagement with the driven gear.

---

This invention relates to synchromesh gears, primarily for application on motor cars.

The many types of synchromesh gears presently known belong mainly to two different classes, i.e. the rigid friction cone types and the elastic ring types. The drawbacks of such already known gears are: the high effort exerted by the driver for changing from one gear ratio to another; the relatively long time needed for the synchronization, and in the high wear, particularly of all friction components.

Moreover, in the synchromesh gears of the rigid, friction cone type, a high effort is required for disengaging the gear, while in the synchromesh gears of the elastic ring type, the danger of sticking exists, together with the impossibility of synchromeshing the first gear both in forward and reverse motion.

The main object of this invention is the provision of a synchromesh gearbox which requires a low effort on the part of driver, for changing from one gear ratio to another, which can be quickly operated, and which is not subjected to frequent troubles due to wear of frictionally engaging components.

Another object of the invention consists in the provision of a synchromesh gearbox wherein any danger of sticking is positively excluded.

A further object of the invention is the provision of a synchromesh gearbox wherein a positive synchronizing action is assured even under the hardest operating conditions.

Yet another object of the invention is the provision of a simple, reliable, rugged and easily operated synchromesh gearbox.

A further object of the invention is the provision of a series of efficient servomechanisms for synchromesh gearboxes.

According to the invention, the above and further objects, which will be best appreciated from a consideration of the following, detailed description, are attained by a particular arrangement in a synchromesh gearbox, that is designed to assure the synchronization of an axially slidable driving toothed member, and of a toothed driven member, in such a manner as to bring both members in mesh with each other, the synchromesh arrangement being characterized in that it comprises: cam tracks, forming a part of the teeth of said driving member; at least one yieldable element, designed to cooperate with said cam tracks, for allowing the axial shifting of said driving member; at least one synchromesh member that cooperates with said cam-track teeth, while said driving member is being axially shifted, and that is formed with surfaces whereon the synchronizing friction occurs; a servomechanism by which said driving and driven members are alternately brought into, and out of mesh, along said friction surfaces, i.e. under the control of the yieldable element, and according to the contour of said cam tracks, the whole in such a manner that said driving and driven members are synchronized when said friction surfaces are engaged, and then brought in mesh with each other while same friction surfaces are disengaged.

The invention will be better understood from a consideration of the following detailed description of a number of now preferred particular embodiment forms thereof, as shown in the accompanying drawings, being both description and drawings given as not restrictive examples only. In said drawings.

We deem expedient to state that the meaning of terms "driven member" and "driving member," as utilized hereinafter, may be reversed without implying any change in the invention.

Moreover, the invention will be described with reference to a particular application of the synchromesh arrangement, i.e. as a synchromesh gearbox on motor cars, without however excluding the possibility of other applications.

Figure 1:
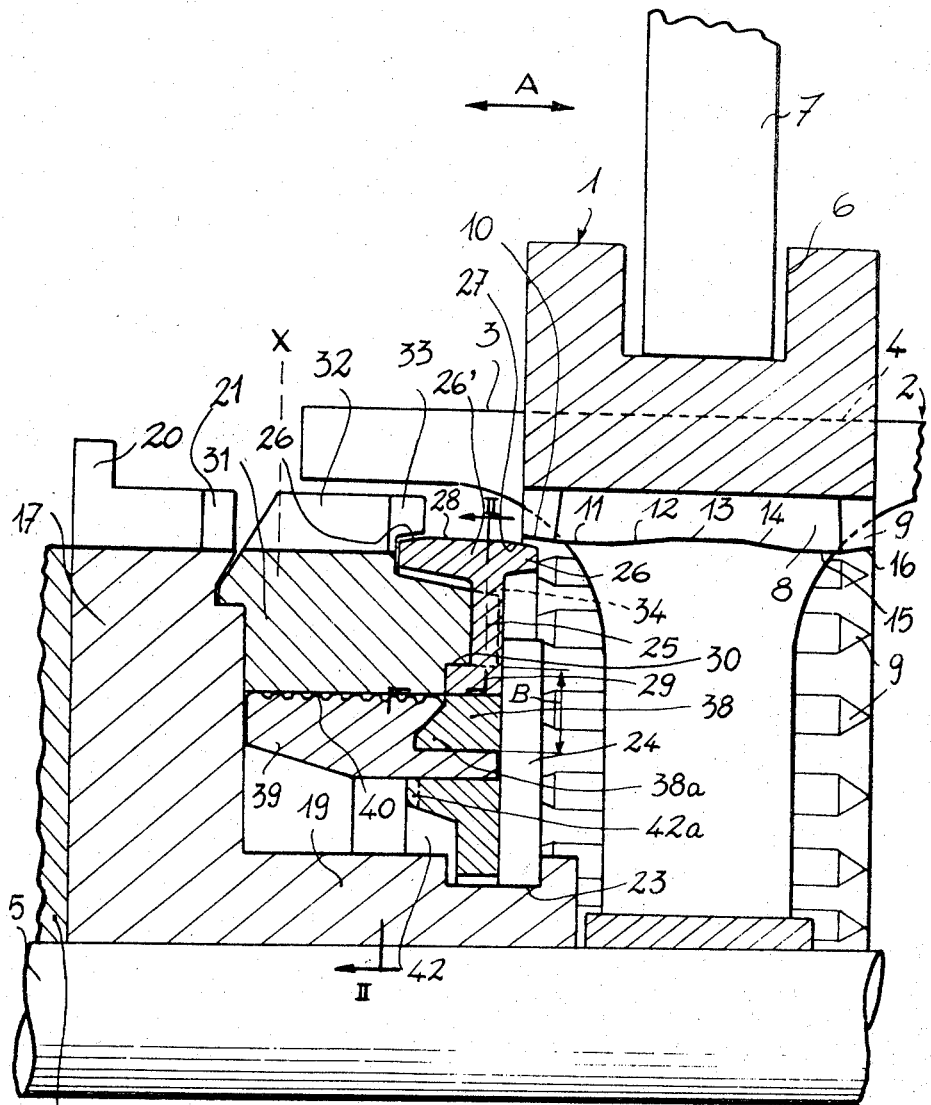
FIG. 1 is a simplified axial section of a first embodiment of a synchromesh arrangement according to the invention, taken on the line I—I of FIG. 2.
Figure 2:
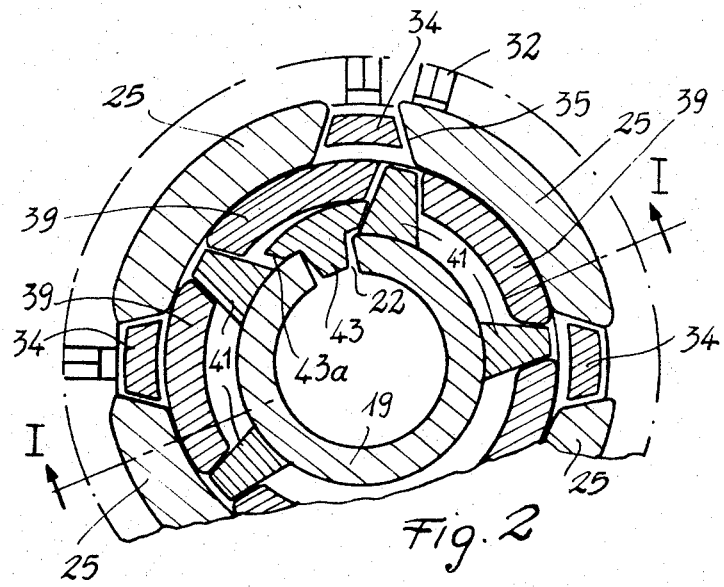
FIG. 2 shows, at practically half the scale of FIG. 1, a section of the synchromesh arrangement taken on the line II—II of FIG. 1, a number of components being omitted to prevent the drawing from becoming too crowded.

Referring now to FIGS. 1 and 2 of the accompanying drawings, 1 is an axially slidable sleeve (or driving member) (see arrows A), that is fitted on a cross member indicated in its entirety by the numeral 2, and of which a guide arm 3 only is shown. Said sleeve 1 is splined as at 4, to accommodate the axial guide arms 3. The cross member 2 is rigidly connected, by any known, not particularly described means, with a driving shaft 5. The outer surface of sleeve 1 is formed with an annular groove 6, and both ends of a fork 7, that is pivotally connected in a point not shown, are engaged therewith. The above described arrangement is well known to those skilled in the automotive field.

Teeth 8 are formed on the inner side of sleeve 1. The ends 9 of teeth 8 are triangularly, or wedge-like shaped, while the truncated area of said teeth have a first cone section 10, followed by a section 11, where the inside area of teeth 8 shows a substantially cylindrical shape. Then follow: a section 12 defined by a cone shaped area; a section 13 contained within a cylindrical surface; a section 14 contained within a cone-shaped area, having an inclination opposite to that of section 12; a section 15, contained within a cylindrical area having a diameter equal to that of section 11, and finally a section 16, contained within a truncated-cone area coaxial with the section 12. By the above described conformation, the teeth show two projections, spaced by a recess, and are delimited by cone shaped areas on their outer ends.

The inner area, as defined by the sections 10, 11, 12, 13, 14, 15 and 16, as well as by the end portions of teeth 8, is what may be considered camming portions of the driving member, that consists in the case in question, of the sleeve 1.

The driven member, indicated in its entirety by the numeral 17, is fast with the main shaft gear 18 of the car. Both the driven member 17 and the gear 18 are loosely fitted, e.g. by means of bronze brushes not shown, on the driving shaft 5.

The purpose of synchromesh arrangement according to the invention is to allow a synchronisation of members 1 and 17.

The driven member 17 is formed with a hub 19, as well as with straight teeth 20, having pointed ends 21, similar to ends 9 of teeth 8, and extending all along its outer periphery.

The hub 19 is formed with an axial slot 22 (see FIG. 2) as well as with an annular groove 23, designed to accommodate an elastic split ring 24, by which the different components of the synchromesh device are kept in place.

Said synchromesh arrangement includes a yieldable disconnecting means having four similar sectors 25, carrying a head or cross wing 26'. The contour of said head consists of two cone sides 26 and 27, spaced by a cylindrical portion. The axial length of each head is such as to allow it to get seated, with a given axial allowance, into the recess as defined by the sections 12, 13 and 14 of cam portions of the teeth 8. A foot 29, formed on the inner end of each sector 25, is designed to engage under an undercut 30 that is formed on the lower side of a revolving toothed ring or synchronizing member 31. The straight teeth 32 of ring 31 are formed on the outer periphery thereof and the ends of teeth 32, directed toward the sleeve 1, are pointed as at 33, like the other teeth 8 and 20. Four projections 34, extending between the sectors 25, are formed on the annular body 31. As shown in the FIG. 2, the sides 35 of sectors 25 are inclined with respect to radial planes, and also similarly inclined are the sides of projections 34, facing said sides 35. The right end of ring 31 (as viewed in FIG. 1) is formed with an annular groove, wherein the heads of sectors 25 are accommodated, while the other end of ring 31 is formed with a centering annular projection, that is engaged with an annular seat of member 17.

38 is an elastic ring, by which the sectors 25 are elastically urged outwardly. This elastic ring is formed with an extension 38a that is engaged into an end circular seat on a series of sectors 39 having roughened faces 40. Five sectors 39, having sides inclined with respect to radial planes, and adapted to cooperate with a series of truncated-pyramid shaped bodies 41, resting directly on the exterior contour of hub 19, are provided in the considered embodiment form.

A substantially elastic split ring 42 of L-shaped cross section, is urged against the lower side of said sectors 39, in order to have same sectors biased outwardly, the ring 42 being formed with seats 42a, facing the bodies 41, and wherein latter bodies are accommodated with a wide play.

Engaged with the axial slot 22 of hub 19 is the lower end of a rocking element 43 of T-shaped cross section, which is designed to establish a mechanical connection between the hub 19, and all other components of synchromesh device. The sides 43a of rocking element 43 are also inclined with respect to a radial plane, thereby to obtain, while the device is operating, a wedging-in—i.e. of servomechanism—effect, due to the co-operation between the rocking element 43 and the bodies 41.

In effect, all inclined surfaces, present in the different components of the synchromesh device, are designed to exert a wedging-in effect, i.e. a servomechanism action.

The operation of the above described device is as follows:

Assuming that the driving member 1 be in neutral, i.e. in the position as shown in the FIG. 1. By a shifting of fork 7, same member 1 is advanced toward the sectors 25. After the section 10 is superposed to section 27, and the member 1 is further advanced, two effects are simultaneously caused, i.e. an inward radial shifting of sectors 25, whereby the roughened faces 40 of sectors 39 are brought away from the lower face of toothed ring 31, and a simultaneous synchronization of the assembly consisting of sectors 25 and of toothed ring 31. Owing to very small inertia of such components, the synchronisation thereof occurs in a nearly instantaneously manner. After such first synchronisation, the teeth 8 are brought in mesh with the teeth 32 of ring 31. When the left end of teeth 8 is in the position indicated by the dash line X (see FIG. 1), the sectors 25 are below the recess as defined by the sections 12, 13 and 14 of teeth 8, whereby these sectors shift outwardly, thus allowing the face 40 of sectors 39 engaged with the adjacent, inner face of toothed ring or synchronizing member 31. As a consequence thereof, a second synchronisation occurs, i.e. the sleeve 1 and the member 17 are synchronized with one another, through the sectors 39, the bodies 41 and the rocking element 43. The kinematic chain formed by the above components will cause a powerful servomechanism effect, i.e. of self-enhancing of the force by which the sectors 39 are pressed against the toothed ring 31. Many factors will contribute to such effects: each sector 39, due to the frictional contact against the ring 31 will tend to turn even more against this ring; a radial, centrifugal component (or wedging-in effect) is imparted to sectors 39 due to the inclination of its sides through which the sectors and the interposed bodies 41 are in contact with each other, and finally, each sector 39 is loaded by the bearing force, due to the whole length of kinematic chain upstream thereof, in the direction of rotation. The sector 39, which is above the rocking element 43, is urged against the toothed ring 31 by the latter element, through which the circumferential bearing force of the whole kinematic chain is transmitted.

The driving member 1 is further advanced along the teeth 32 of toothed ring 31, until the cone surface 27 of sectors 25 come into contact with the cone section 14 of teeth 8; as a consequence thereof, sectors 25 will tend to shift themselves radially toward the inside. In that moment, two conditions may exist: either the second synchronisation is still being performed, or it has been already completed.

In the first of the above cases, said motion, and thus the axial advance of driving member 1, is hindered by the sectors 39, owing to the servomechanism action exerted by them. Consequently, the driving member 1 is stopped, until the synchronisation is completed. However, in general, such occurrence (incomplete synchronisation), will rarely take place, owing to the exceptionally high speed of synchronising action.

Thus, the synchromesh device according to this invention is characterized by an inherent "non-permissive" feature, i.e. it does not allow the teeth to strike or to drag each other, thereby preventing the driving member 1 from moving toward the driven member 17 before these members have been wholly synchronised with each other.

In the latter case—or even in the former case, however after the stay of driving member 1, i.e. upon completion of the second synchronisation—the sleeve 1 is allowed to move axially forward, thus shifting the sectors 25 in a centripetal direction, whereby the sectors 39 are disengaged from the toothed ring 31, which latter is thus disengaged from the member 17. In such a manner, any mutual jamming of teeth 8 and 20 is positively prevented, since a relative rotary motion of elements 1 and 17 is allowed. The member 1 can be thus moved forward by a very low effort until the teeth 8 and 20 are in complete mesh with each other. Before the completion of latter operation, the truncated-cone shaped section 16 of teeth 8 engages with the cone shaped section 26 of sectors 25, whereby the sectors 25 are slightly shifted radially, under the thrust of elastic rings 38 and 42 and of the centrifugal force. Thus, an inter-engagement of cone surfaces is obtained, by which the member 1 is reliably kept in mesh with the member 17.

In the disengaging operation, the above stated steps occur in a reversed sequence.

It is to be remarked that, for a correct operation of synchromesh device, the distance B (see FIG. 1) between the opposite faces of ring 31 and of sectors 39, will be equal to, or slightly greater than the sum of thicknesses of feet 29 of sectors 25, and of thickness of elastic ring 38, when the ring 31 is contacted by the sectors 39. In order that the above requirement can be satisfied even after extended times of operation, the surfaces of sectors 25 and of ring 38 that are designed to get engaged with each other are made of a material having a wearing rate similar to that of surface 40 and of cooperating surface of ring 31. However, since the strength and time of friction between both former interengaging surfaces are smaller than those between the latter interengaging surfaces, softer materials (i.e. having a greater wearing rate) are selected for surfacing the sectors 25 and the ring 38; the materials should also have inherent antifriction properties (e.g. bronze and the like).

No need exists that the kinematic chain of the expansion servomechanism, consisting of components 39, 41 and 43, be made as shown in the FIG. 2; it may be also realized in other ways, provided that it is torsionally connected in a really efficient manner with the hub 19, and that the expanding servomechanism action can be exerted by it to the extent required for the performance of synchromesh device. When said kinematic chain includes at least one elastic ring, then the elastic rings 38 and 42 may be omitted.

In the previously described embodiment form sectors 25 (which may be substituted by an elastic ring) are provided, in order to regulate the different operating steps of synchromesh device, and also to allow the member 1 to mesh with the member 17, without any possible jamming. In particular, said sectors (or the ring) are positioned in such a manner as to come firstly into contact with the element 1, when this latter is shifted toward the driven member 17.

Figure 3:
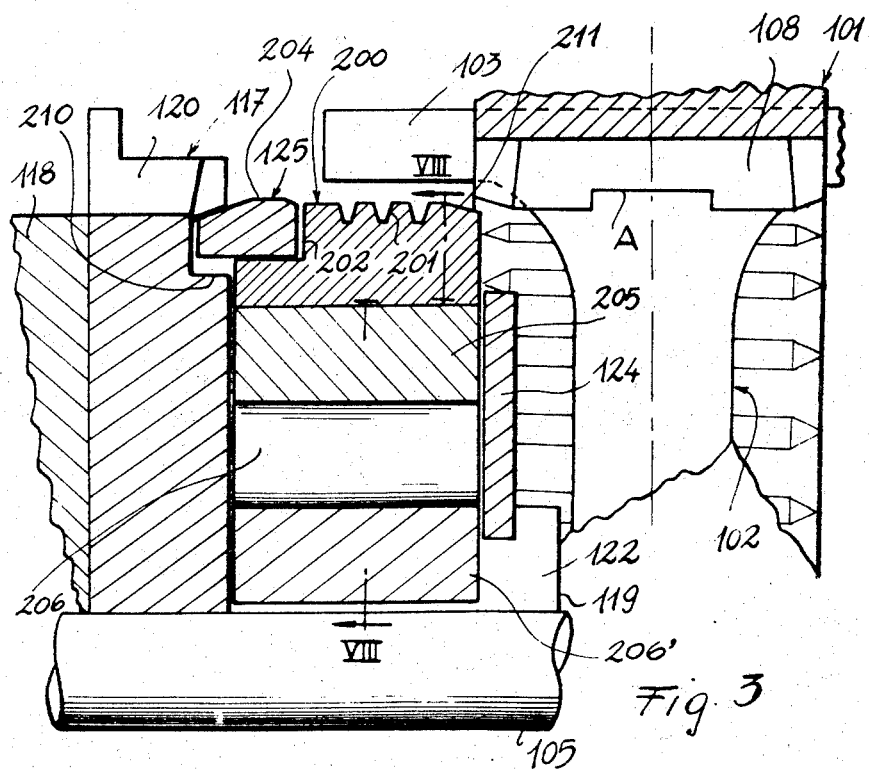
FIG. 3 is an axial section, having a portion thereof broken away, of another embodiment of the synchromesh arrangement according to the invention.
Figure 4:
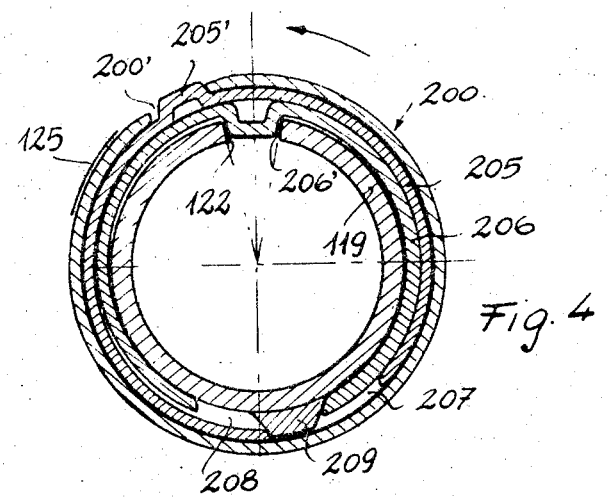
FIG. 4 is a diagrammatic section, on a smaller scale, taken on the line VIII—VIII of FIG. 3, of the servomechanism embodied in the synchromesh arrangement as shown in the FIG. 3, and also having some portions thereof broken away.

In the embodiment form as shown in the FIGS. 3 and 4, an elastic ring is utilized instead of sectors 25, this ring being positioned nearer the driven member, whereby it is contacted by the driving member about half-way along the engaging stroke.

In the hereinafter described embodiment, all like or similar components are indicated by the same reference characters of FIGS. 1 and 2, to which the numeral 100 is added.

The driving member 101, having inner teeth 108, formed with cone tapered ends, as well as with a central recess A that is defined by right angles (in order to have the member 101 held more easily in mesh, even after extended times of operation) can be axially shifted by a fork (not shown) all along a cross member 102, and more precisely along the axial arms 103 thereof. Said cross member is rigidly keyed on the shaft 105, wherein the driven element 117, in mesh with the gearing 118, is also revolvingly fitted. Said driven member 117 is comprised of frontally pointed teeth 120, and of a hub 119 that is formed with an axial slot 122. The synchronizing member, corresponding to synchronizing member 31 of FIG. 1, consists of an elastic friction slit ring 200, having an outer surface grooved as at 201. Said friction ring 200 is also formed with a seat 202, designed to accommodate an elastic ring 125, having a peripheral projection 204, that consists of a middle, cylindrical portion, and of two oppositely cone-tapered portions. Said ring 125 is equivalent to sectors 25 which, as previously stated, can be substituted by an elastic slit ring.

A second, also elastic ring 205, is fitted within the elastic ring 200 (see FIG. 4). This ring 205 is formed with an outwardly directed projection or hump 205', located in the slit 200' of the ring 200. A further elastic ring 206, having a projection 206' engaged into the axial slot 122 of hub 119, is surrounded by the elastic ring 205. The end surfaces, by which the slits 207, 208 of rings 205, 206 are defined on either side, are inclined with respect to radial planes, thereby to contribute to wedging-in action, i.e. to servomechanism effect, by cooperating with a prismatic block 209, having a substantially trapezoidal cross section, and that simply rests on the outer contour of hub 119. The projection 205' and the adjacent end-sides of ring 200 are also inclined with respect to radial planes.

The different synchromesh device components are kept in place by a retainer ring 124, which is assisted in its action by the lower side of teeth 120 and the notch of driven member 210. In more detail, latter contrivance serves also to keep the yieldable ring 125 in its place.

A cone-shaped portion is formed on the elastic ring 211, on the right side thereof, when viewed as in the FIG. 3, i.e. toward the driving member 101, in order to facilitate the meshing thereof.

The left side of elastic ring 125 is advantageously formed with a cone-shaped portion, as shown in the FIG. 3, the ring being fitted in its seat 202 in such a manner as to be allowed to axially shift itself with respect to teeth 120, by which its diameter is defined. The purpose of the arrangement is to allow a spontaneous expansion of ring 200, when the member 101 is moved away therefrom should, after a long time of operation, ring 200 and the sleeve 101 be worn to such an extent that, in default of said expansion, the ring 200 and the sleeve 101 would not properly interfere with each other.

Under such conditions, the wear of mutually rubbing surfaces of ring 200 and of sleeve 101 is accompanied by an equal wear of cone surface by which the ring 125 engages with the teeth 120, ring 125 being acted upon axially by the sleeve 101 and radially by the ring 200 in the course of synchronization. To such a purpose, the left cone portion of ring 125 is advantageously extended, and is made of a softer material. Thus, the wear to which the surfaces are subjected in the course of synchronizing action is compensated.

The operation of the above described embodiment form is as follows:

The member 101 is brought into contact—in the manner already described in full detail—with the surface 211 of friction ring 200, thereby causing a contraction thereof. When the left cylindric surface of member 101 starts rubbing against the cylindric surface of friction ring 200, the driven member 117 is synchronized.

In the course of synchronization, the sleeve 101 is moved toward the member 117, until contacting the peripheral projection 204 of ring 125. In this very moment, a second synchronization occurs, i.e. that of same ring. Then, two conditions may exist, i.e. the main synchronization is either already completed, or is being made.

In the latter case, the forward motion of sleeve 101 is counteracted by the servomechanism effect, whereafter on completion of synchronization, the member 101 can resume its forward motion, whereby the projection 204 is engaged into the central seat A of teeth 108, which allows the member 101 to be kept coupled with the driven member 117, when the teeth 120 are in mesh with the teeth 108.

Figure 5:
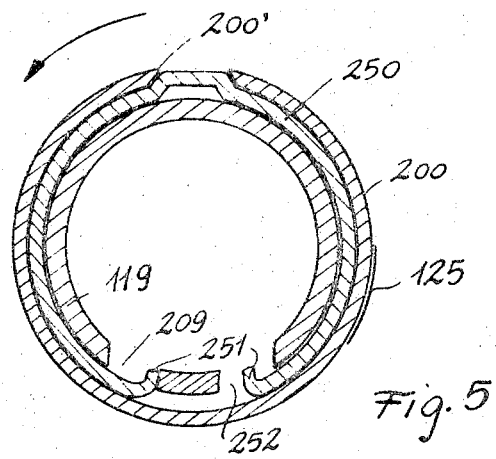
FIG. 5 is a cross-section, similar to that taken on the line VIII—VIII of FIG. 3, of a variant of the embodiment shown in FIG. 4.

A variant of kinematic chain of FIG. 4 is shown in the FIG. 5 is in a manner similar to that of former figure. In this embodiment, no change is made in the design of both outer rings, i.e. the friction ring 200 and the elastic ring 125. A projection with which an niner ring 250 is formed, and that is defined by inclined sides, is engaged into the interruption 200' of ring 200. The inner ring 250 is of the slit type, and has hook-bent ends 251 respectively extending into axial slots 252, with which the hub 119 is formed.

This embodiment is particularly advantageous owing to the simplicity of its design, and also to the fact that the different rings by which it is made can be fabricated in a very simple manner, starting from a profiled band.

The ring 125 may be placed either to the right or to the left side of synchronizing ring 200.

When elastic rings are used in the servomechanism arrangement, such ring may be fitted therein under a given pre-stressing, that may be either negative or positive, i.e. same rings will tend either to expand, or to contract themselves, in respect of configuration taken by them when fitted in the device.

In some embodiments, bearing rollers may be provided in order to minimize the friction. Such rollers might be interposed, e.g. between the sectors 25 and the sectors 39 of the first embodiment form.

The compensation of wear of the surfaces which are acted upon by the synchronizing friction can be attained even by the plastic deformation of the left edge of ring 125, that is caused by the same, above described wearing factors.

The surface 211 of ring 200 may be slightly rounded instead of showing a uniform taper, in order to facilitate the engagement of sleeve 101 with same ring 200, and the same holds also for the taper surface of toothing 108 on sleeve 101.

The cam sections of sleeve 1 (or 101), previously described as cylindrically shaped, may be also slightly tapered in either directions, depending on whether a higher synchronizing effect, or a greater thrust on the sleeve in the engaging direction are required. A similar taper may be formed also on the synchronizing ring.

Should the same sleeve be utilized for two synchromesh devices (located on either sides thereof), then the cam of the sleeve teeth may show more than two projections of the type as indicated by numerals 11 and 15.

Moreover, as regard to the embodiment form shown in the FIG. 5, the ring 250 may have arcuate branches from its projection received in the slots and being of different length.

According to a possible variant, both ends of ring 250 may be left straight, instead of being crooked, and the resulting plain ends (which may be at an angular distance smaller than 180 degrees from the projection thereof) can be allowed to rest on an arcuate sector shaped band having a substantially similar diameter. In such a case, both band ends are hook shaped, and are designed to engage each into different axial grooves of hub 119.

Thus, with the invention there is provided a synchromesh gearing which includes the coaxial rotary driving and driven gears 1 and 17, respectively, in the case of FIG. 1 and 101, and 117, respectively, in the case of FIG. 3. The shaft 5 of FIG. 1 together with the cross member 2, and the shaft 105 together with the cross member 102 of FIG. 3 form a support means supporting at least one of these gears, namely the driving gear 1 or 101, for axial displacement with respect to the other gear between the disengaged position, where the gears are axially displaced and out of engagement as shown in FIGS. 1 and 3, and a meshing position, where the gears mesh with each other. The ring 31 of FIG. 1 and the ring 200 of FIG. 3 form in their respective embodiments a synchronizing means which is operatively connected with the driven gear, 17 in the case of FIG. 1 and 117 in the case of FIG. 3, for driving the latter at the speed of rotation of the driving gear as the latter is displaced from its disengaged position to its meshing position, so that as a result during meshing of the gears they will rotate at the same speed. A transmission means is operatively connected with the driving gear 1 or 101 and with the synchronizing means 31 or 200 for transmitting a drive from the driving gear to the synchronizing means so as to drive the latter at the speed of the driving gear so that the synchronizing means drives the driven gear at the latter speed as the driving gear moves into meshing engagement with the driven gear. This latter transmission means is formed in the embodiment of FIG. 1 by the train of elements starting with the sectors 25 which are frictionally engaged and driven by the driving gear 1 and extending from the latter through the elements 38 and 39 to the frictional surface 40 of the latter which engages the ring 31 so as to drive the ring 31 which forms the synchronizing means of this embodiment. In the embodiment of FIG. 3, the transmission means is formed by the surfaces of the teeth 108 and the synchronizing ring 200 which frictionally engage each other so as to transmit the drive from the driving gear 101 to the ring 200. A disconnecting means coacts with this latter transmission means and responds automatically to movement of the driving gear from its disengaged to its meshing position for at least momentarily disconnecting the drive provided by the transmission means just prior to meshing of the gears to provide substantially free rotary movement for the driven gear with respect to the driving gear so as to facilitate meshing of the gears. This disconnecting means is formed by the sectors 25 in the embodiment of FIG. 1 and the ring 125 in the embodiment of FIG. 3. Thus, in the embodiment of FIG. 1 when the camming portions of the teeth 8 displace the sectors 25 inwardly toward the axis of the shaft 5 by a sufficient distance, the feet 29 of the sectors will act on the ring 38 so as to displace the exterior surface 40 of the ring 39 inwardly away from the synchronizing means 31 of this embodiment so that the drive to the latter will be disconnected, thus disconnecting the synchronizing drive to the driven gear 17 providing for the latter substantially free rotary movement with respect to the driving gear just prior to meshing of the teeth of the latter with the teeth of the former, so as to facilitate the meshing of the teeth. With the embodiment of FIG. 3, the disconnecting means formed by the elastic ring 125 acts when the ring 125 is compressed by the teeth 108 to displace the exterior surface of the ring 200 inwardly away from the teeth 108 so as to disconnect the drive to the synchronizing means and thus also disconnect the drive from the synchronizing means to the driven gear 117, providing for the latter a substantially free rotation to facilitate meshing of the driving and driven gears.

It is to be noted that the synchronizing means drives the driven gear through a second transmission means formed in the embodiment of FIGS. 1 and 2 by the elements 39, 41, and 43 which achieve the servoaction referred to above, so that when the surface 40 is displaced inwardly away from the inner surface of the synchronizing means 31, the drive to the driven gear 17 is necessarily interrupted, thus providing for the substantially free rotary movement of the latter at least momentarily prior to actual engagement of the teeth of the driving gear with the teeth of the driven gear. With the embodiment of FIG. 3 the second transmission means for transmitting the drive from the synchronizing means 200 to the driven gear 117 takes the form of the rings 205 and 206 which achieve the servoaction for this embodiment, so that in this case also when the exterior surface of the synchronizing means 200 is displaced inwardly away from the teeth 108 to interrupt the transmission of the drive from the driving gear to the synchronizing means, there will also be an interruption in the driving of the driven gear 117 so that the latter has the opportunity, at least momentarily, for substantially free rotary movement to facilitate the meshing of the teeth of the driving and driven gears.

Furthermore, it is to be noted that when the driving gear is in its idle position shown in FIGS. 1 and 3, the synchronizing means 31 or 200 is not driven since at this time the driving gear is out of cooperative relation with respect to the synchronizing means.

In addition, it is to be noted that in both embodiments the transmission means between the driving gear and the synchronizing means includes a surface of the synchronizing means and a surface of a transmission element of the transmission means which frictionally engage each other. Thus, in the embodiment of FIG. 1 it is the inner surface of the synchronizing means 31 which is frictionally engaged by the exterior surface 40 of the transmission element 39, while in the embodiment of FIG. 3 it is the exterior surface of the synchronizing means 200 which is frictionally engaged by the transmission elements formed by the innermost surface portions of the gear teeth 108. It is particularly to be noted that the disconnecting means formed by the sectors 25 or the elastic ring 125 disconnects the drive provided by this transmission means by displacing one of the latter surfaces away from the other. Thus, in the case of FIG. 1 it is the surface 40 which is displaced away from the inner surface of the synchronizing means 31, while in the case of FIG. 3 it is the exterior surface of the synchronizing means 200 which is displaced inwardly away from the innermost surface portions of the teeth 108.

Therefore, as a result of the action of the disconnecting means of the invention, after the driven gear has been brought up to the speed of rotation of the driving gear by the synchronizing means, there is at least momentarily just prior to actual meshing of the teeth of the driving and driven gears a disconnection of the synchronizing drive for the driven gear providing substantially free rotary movement for the latter, so that if it should happen that the teeth of the driving gear are substantially in alignment with the teeth of the driven gear, the latter can nevertheless rotate substantially freely with respect to the driving gear to bring the gaps between the teeth of the driven gear into alignment with the teeth of the driving gear so as to greatly facilitate the meshing of the gears as a result of this action of the disconnecting means 25 or 125.

While the invention has been described in detail with respect to certain, now preferred examples and embodiments thereof, it will be understood by those skilled in the art, after understanding the invention, that various changes and modifications may be made therein, without departing from the spirit and scope of same invention, and is intended, therefore, to cover all such changes and modifications in the appended claims.

I claim:

1. Synchromesh gearing comprising coaxial rotary driving and driven gears, support means supporting at least one of said gears for axial displacement with respect to the other between a disengaged position, where said gears are axially displaced and out of engagement, and a meshing position, where said gears are in meshing engagement, synchronizing means operatively connected with said driven gear for driving the latter at the speed of rotation of the driving gear as said one gear is displaced from said disengaged position toward said meshing position, so that during meshing of the gears they will rotate at the same speed, transmission means operatively connected with said driving gear and synchronizing means for transmitting a drive from said driving gear to said synchronizing means to drive the latter at the speed of said driving gear so that said synchronizing means drives said driven gear at the latter speed as said one gear approaches said meshing position, and disconnecting means coacting with said transmission means and responding automatically to movement of said one gear from said disengaged to said meshing position for at least momentarily disconnecting the drive provided by said transmission means just prior to meshing of said gears to provide substantially free rotary movement for said driven gear with respect to said driving gear to facilitate movement of said one gear into meshing engagement with said other gear.

2. The combination of claim 1 and wherein said one gear is said driving gear, and said driving gear, when in said disengaged position thereof, being axially displaced not only from said driven gear but also from said synchronizing means so that the latter is not driven by said transmission means when said driving gear is in said disengaged position thereof.

3. The combination of claim 1 and wherein said synchronizing means, said transmission means, and said disconnecting means form three means at least one of which is composed of frictionally coacting elements made of materials which will provide substantially constant wear of said frictionally coacting elements during operation thereof.

4. The combination of claim 1 and wherein said transmission means includes a surface of said synchronizing means and a transmission element having a surface frictionally engaging said surface of said synchronizing means to transmit the drive thereto.

5. The combination of claim 4 and wherein said disconnecting means acts on one of the latter surfaces to displace it to a position out of engagement with the other of said surfaces.

6. The combination of claim 5 and wherein said disconnecting means displaces said surface of said transmission element away from said surface of said synchronizing means.

7. The combination of claim 6 and wherein said synchronizing means is in the form of a substantially rigid ring freely turnable with respect to said driven gear and having at its exterior teeth for meshing with said driving gear, said surface of said synchronizing means being formed by the inner periphery of said substantially rigid ring, and said transmission element being surrounded by said synchronizing means and having an exterior friction surface engaging said inner surface of said synchronizing means.

8. The combination of claim 7 and wherein said disconnecting means includes sectors situated in the path of movement of teeth of said driving gear to be radially displaced inwardly thereby, and said sectors acting on said transmission element to deflect the latter inwardly away from said inner surface of said ring of said synchronizing means.

9. The combination of claim 5 and wherein said disconnecting means displaces said surface of said synchronizing means away from said surface of said transmission element.

10. The combination of claim 9 and wherein said surface of said transmission means is formed by exterior surface portions of teeth of said driving gear, said teeth of said driving gear having portions which form transmission elements of said transmission means.

11. The combination of claim 10 and wherein said disconnecting means is in the form of a ring situated in the path of movement of said teeth of said driving gear to be engaged and compressed thereby, said ring engaging said synchronizing means to radially compress the latter inwardly away from said teeth of said driving gear to disconnect said drive.

12. The combination of claim 11 and wherein said ring of said disconnecting means is situated between said synchronizing means and said driven gear.

13. The combination of claim 12 and wherein said ring which forms said disconnecting means has an axial play between said synchronizing means and said driven gear.

14. The combination of claim 5 and wherein a second transmission means is operatively connected on the one hand to said synchronizing means and on the other hand to said driven gear to transmit a drive to the latter from said synchronizing means, whereby when said disconnecting means disconnects the drive to said synchronizing means, the drive is also disconnected to said driven gear through said second transmission means.

15. The combination of claim 14 and wherein said second transmission means coacts with said driven gear for providing a transmission thereto with a servo-locking action.

16. The combination of claim 15 and wherein said second transmission means includes substantially circular sectors surrounding each other and each having a substantially central projection and a pair of free ends situated from said projection by less than 180°.

17. The combination of claim 16 and wherein said free ends of one sector are situated at different angular distances, respectively, from said projection.

References Cited

UNITED STATES PATENTS

| | | | |
|---|---|---|---|
| 2,339,512 | 1/1944 | Peterson et al. | 192—53.1 |
| 2,579,090 | 12/1951 | Rabe | 192—53.1 |
| 2,932,373 | 4/1960 | Schmid | 192—53.1 |

DONLEY J. STOCKING, *Primary Examiner.*

ARTHUR T. McKEON, *Assistant Examiner.*